UNITED STATES PATENT OFFICE.

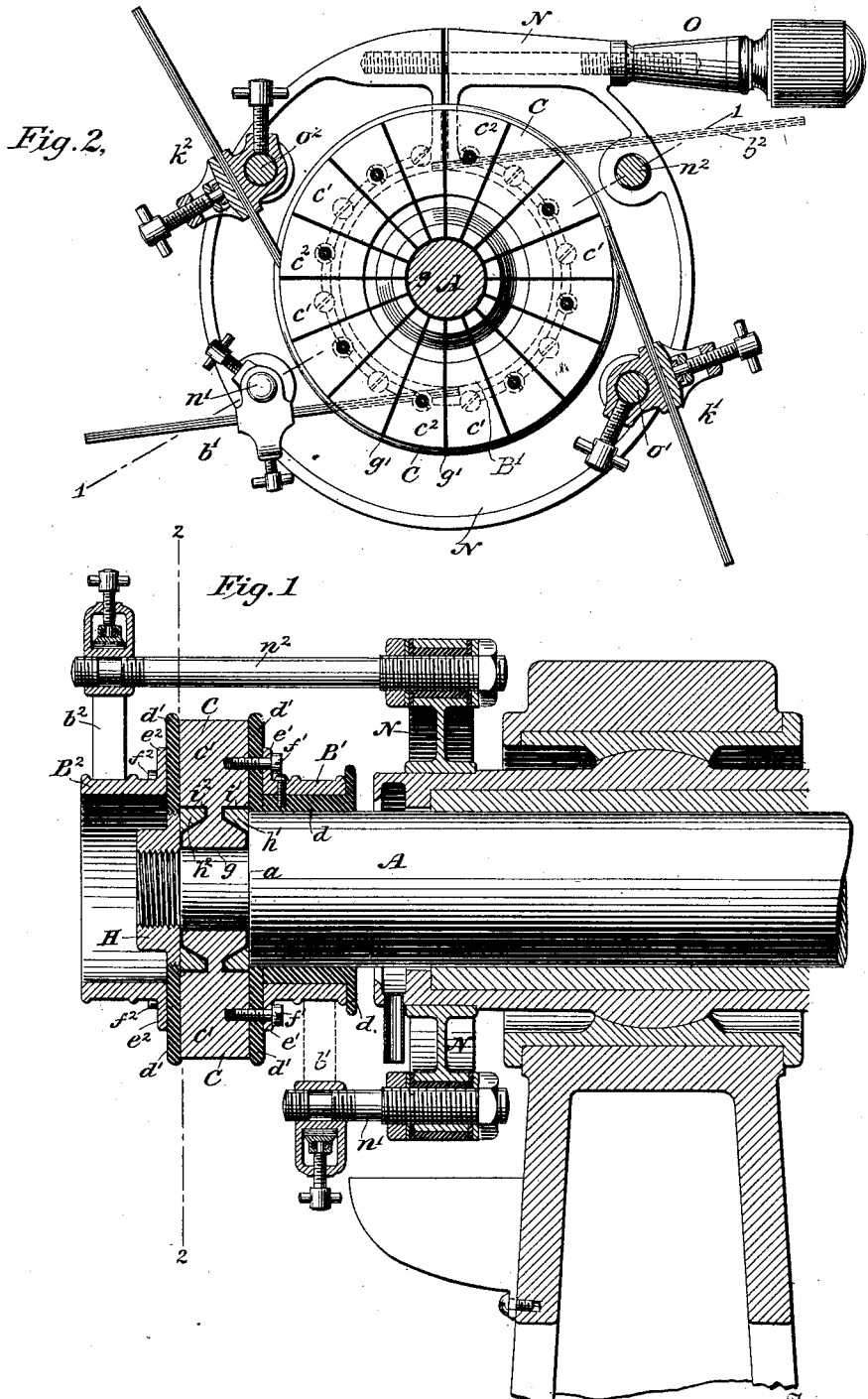

OLIVER B. SHALLENBERGER, OF ROCHESTER, ASSIGNOR TO GEORGE WESTINGHOUSE, JR., OF PITTSBURG, PENNSYLVANIA.

COMMUTATOR FOR ELECTRIC GENERATORS.

SPECIFICATION forming part of Letters Patent No. 367,934, dated August 9, 1887.

Application filed November 18, 1886. Serial No. 219,221. (No model.)

*To all whom it may concern:*

Be it known that I, OLIVER B. SHALLENBERGER, a citizen of the United States, residing in Rochester, in the county of Beaver and State of Pennsylvania, have invented certain new and useful Improvements in Commutators for Electric Generators, of which the following is a specification.

The object of the invention is to provide suitable means for commutating a fractional portion of the total current derived from an alternate-current generator for the purpose of maintaining the magnetic field of such generator.

It is evident that if non-alternating currents are to be be supplied to the field-magnets of such a generator and derived from the alternating impulses delivered by the armature, then the commutator must be so constructed as to reverse the connections through the field-magnets at each reversal of the current. This is most conveniently accomplished by placing the commutator directly upon the shaft of the armature, for then its revolutions must necessarily coincide with those of the armature. This commutator and contact-rings for supplying currents thereto are used in addition to the regular contact-rings of the machine, and the currents delivered thereto are derived from the conductors leading from the machine and connected with the armature terminals through the usual contact-rings in any convenient manner.

In the accompanying drawings, Figure 1 is a longitudinal vertical section of an apparatus embodying the invention, and Fig. 2 is a sectional view on line 2 2 of Fig. 1 of a commutator and collecting plates embodying certain details of the invention.

Referring to the figures, A represents the shaft of an alternate-current generator, and $B'$ $B^2$ the two collecting-rings for the two brushes $b'$ $b^2$. These two rings are mounted upon the shaft A upon opposite sides of the commutator C. They are insulated from the shaft by suitable non-conducting material—such as vulcanized fiber—as shown at $d'$ $d'$. The collecting-rings are constructed with flanges $e'$ $e^2$, respectively, through which screws $f'$ $f'$ and $f^2$ $f^2$ extend into the plates $c'$ $c^2$ of the commutator C. The separate plates or divisions of the commutator C are insulated from each other, as shown at $g'$ $g'$, Fig. 2. They are held in position by two projecting rings, $h'$ $h^2$, which are preferably made to dovetail with the plates and the sections of insulating material, and are carefully insulated from the plates by sheets of non-conducting material, as shown at $i'$ $i^2$. The end of the shaft A is preferably reduced in diameter, and carries a nut, H, by which the rings $h'$ and $h^2$ are firmly clamped in position between the shoulder $a$ upon the shaft and the nut H. Each alternate plate, as $c'$ $c^2$, of the commutator is respectively connected by the conducting-screws $f'$ and $f^2$ with the rings $B'$ $B^2$. These screws serve thus both to form the circuit-connections and to secure the several parts in their proper positions.

The contact-brushes $b'$ $b^2$ are supported in any convenient or well-known manner from arms $n'$ and $n^2$ so as to bring their respective ends in contact with the corresponding collecting-rings $B'$ and $B^2$. The brushes $k'$ $k^2$ of the commutator C are likewise supported in any convenient manner from independent arms $o'$ and $o^2$. The four arms $n'$, $n^2$, $o'$, and $o^2$ are preferably carried upon a frame, N, which is in itself adjustable as to its angular position upon the shaft by means of a screw, O, or other equivalent mechanism.

The brushes $k'$ and $k^2$ should be so set that one has the lead of the other to the extent of one plate or division currents of the commutator, so that currents of opposite polarity will be simultaneously collected by the brushes respectively.

The rectified currents from the brushes $k'$ $k^2$ will all be of like polarity, and may be employed in any convenient manner for maintaining the magnetism of the field-magnets of the generator, or for other purposes.

I claim as my invention—

The combination of a rectifying-commutator, the shaft of an electric machine carrying the same, two contact-rings upon opposite sides of the commutator, flanges formed upon said rings adjacent to said commutator, and screws for clamping and connecting the respective flanges to the alternate plates of the commutator.

In testimony whereof I have hereunto subscribed my name this 29th day of October, A. D. 1886.

OLIVER B. SHALLENBERGER.

Witnesses:
 ALBERT SCHMID,
 CHARLES A. TERRY.